H. Dexter,
Copying Statuary.
Nº 2,519.    Patented Mar. 28, 1842.
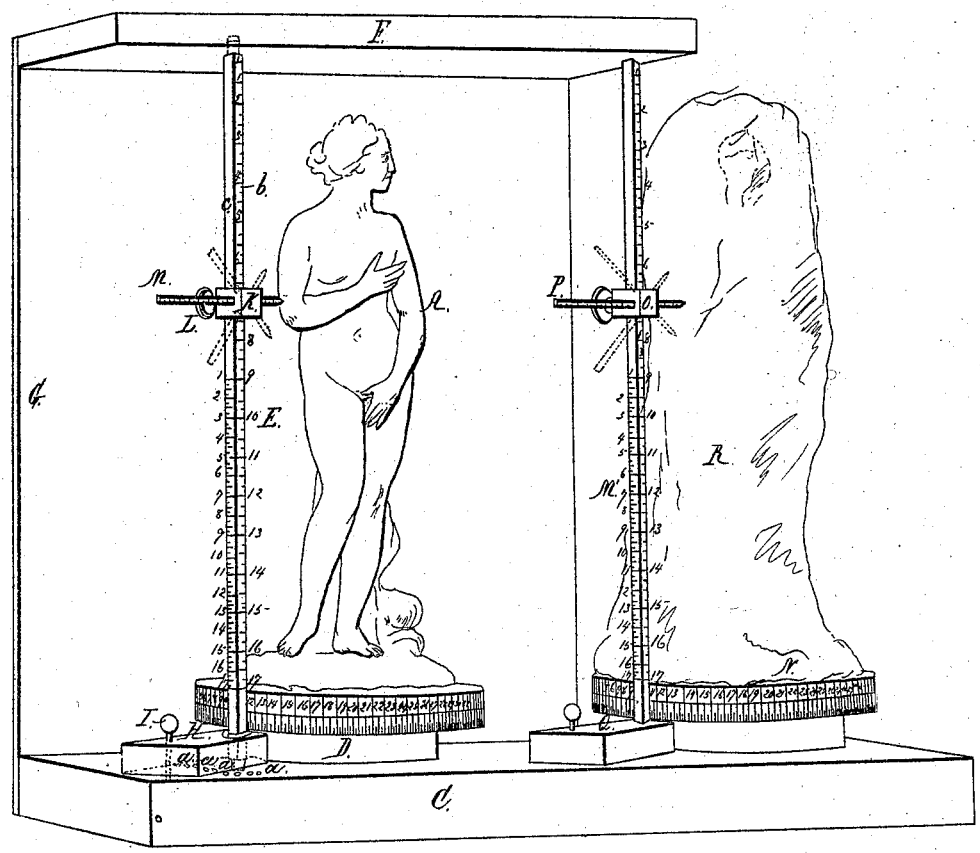

UNITED STATES PATENT OFFICE.

HENRY DEXTER, OF BOSTON, MASSACHUSETTS.

APPARATUS FOR SCULPTORS TO BE EMPLOYED IN COPYING BUSTS, &c.

Specification of Letters Patent No. 2,519, dated March 28, 1842.

*To all whom it may concern:*

Be it known that I, HENRY DEXTER, of Boston, in the county of Suffolk and State of Massachusetts, have invented a new and useful apparatus, to be used by sculptors and carvers and for producing a copy in marble or other material from models or statuary in general, of which apparatus the following description, in connection with the accompanying drawing, therein referred to, forms a full and exact specification.

In the same I have set forth the nature and principles of my improvements, by which they may be distinguished from others of a like character, together with such parts or combinations of the same as I claim and for which I solicit Letters Patent.

The drawing above mentioned represents a perspective elevation of my invention.

The peculiar object of my improvements is to aid an artist to correctly measure a model or statue and thence to define or determine any point or points in the material (that he is to convert into a piece of statuary), corresponding to any particular point or points of the model. For this purpose the statue, bust, or group A, to be copied in marble or other suitable material, is to be firmly cemented, or otherwise properly confined, upon the top of a horizontal circular revolving table B, which is somewhat elevated above a strong plank or platform C, of suitable size. The circular table B should be arranged in any convenient manner so as to be turned around or upon a pivot or axis in the center of the same, the said pivot or axis being inserted in, or connected to, the platform C, or in the top of a circular block D, which intervenes between the table B and the platform and which serves to support the circular table B at its requisite elevation above the platform.

The circumference or periphery of the revolving table should be divided into degrees or into any convenient number of equal parts, as seen in the drawing.

E is a steel or metallic rod, square in its horizontal cross section and raised directly against the outer surface of the periphery of the revolving table B and perpendicularly to the same and the platform C. The rod is supported and turns at its top, in a suitable bearing formed in or connected to a horizontal plank F which latter is secured in position by a back-board G elevated from and secured to the rear side of the platform C and also to that of the plank F. The foot of the rod E passes through one end of a sector shaped arm or piece of wood H, and rests and turns in a suitable step or bearing formed in the top of the platform C. By means of the arm H the rod E may be turned in a horizontal direction or in its bearings at top and bottom, and be confined in any position by a pin I which passes through a perpendicular hole in the arm and thence into one of a series of holes *a, a, a*, bored in the upper surface of the platform C at equal distances apart and in the arc of a circle struck from the center of the foot of the shaft.

The whole length of the front side *b* of the rod E may be graduated into feet and inches and parts of inches, and regularly numbered from the highest division, downward, or in any other convenient manner. The other side *c* adjacent to the side *b* or that which is at right-angles to it should also be graduated into the same number of spaces, but each should correspond to but half the length of those of the first side as seen in the figure. The spaces or distances between the divisions of the second side *c* may be one third or one fourth of those of the first side or in any other desirable proportion to the same. In the figure the graduations of the side *c* are commenced at the center of the rod and continued and numbered downward.

A piece of metal K is fitted upon the rod E so as to be easily slid up and down upon the rod and confined at any desirable elevation thereon by a set screw L. A square hole is cut through the piece of metal K through which a graduated rod or square bar M is inserted at right angles to the rod E or so as to be in a plane parallel to the side *b* of the rod, and plays loosely through the slide so as to be moved back and forth at pleasure. The inner end of the rod M is ground down to a point. Holes may also be formed diagonally through the slide K, through which the bar M may be inserted in the positions denoted by the dotted lines.

Another revolving table N and vertical rod M′, having a slide O, horizontal bar P and arm Q, all constructed in every respect precisely similar to those first mentioned, are arranged upon the platform D, as seen in the drawing and the block of marble R from which the copy of the statue A is to be formed is cemented or otherwise properly confined upon the top of the revolving table N. The above constitutes the description of the apparatus and the method of using the same is as follows.

We will suppose that we desire to find how far the marble must be cut away to arrive at a point therein which shall correspond with some point in the vicinity of an elbow of the statue. The slide K should be elevated to such a position as to bring the point of the graduated index bar M about in a horizontal plane with the assumed point in elbow of the statue. This being effected the revolving table B, should be turned around on its central pivot, until the assumed point in the elbow is nearly in juxtaposition with the point of the index bar M. These two points are then made to coincide, by pressing the index bar inward until it rests against the point of the elbow. Then noting the elevation at which the slide K stands on the bar E, we raise the slide O upon the rod M to a corresponding height and then clamp it by its set screw. We next note the divisional distance that the point of the rod M is projected beyond the slide K, and also the division upon the periphery of the table B which is nearest in contact with the side $h$ of the rod E. Then turning the table N, so that the division on its periphery which agrees with this latter shall be in contact with the side of the rod M'—which corresponds to the side $d$ of the rod E—we next force the index bar P inward or toward the block of marble, and with the chisel reduce or chip away said block, until the point of the bar in contact with the marble is projected beyond the slide O a distance equal to that which was denoted on the index bar M. By a similar process we proceed to find each and every desirable point on the block K until the form and proportions of the statue are completely developed.

As it is desirable that the index bar M should always stand as nearly perpendicularly to a tangent plane passing through the assumed point in the original statue as possible, the arm H affords the means of turning the rod E horizontally as before mentioned, so as in many cases to more completely effect the object intended.

It was before mentioned that the side $c$ of the rod E was graduated into divisions, each of which was in a certain proportion to each of those of the side $b$. For the sake of illustration we will make each division of the side $c$ to equal one half of each division of the side $b$. We now must imagine the rod E, carrying the index bar M, to be turned around until the index bar shall be in a vertical plane passing through the center of the horizontal revolving table B. Next slide the index bar inward until the extremity of its pointed end shall project beyond the rod E a distance equal to one half the distance between the rod and a vertical line passing through the center of the revolving table and then mark the junction or intersection of the top face of the index bar, with the plane of the left side of the slide K. From this mark divide the top face of the rod in a direction from the pointed end or toward the opposite end into spaces which shall bear the same proportion to the divisions in its side as those of the side $c$ of the rod E do to those of its side $b$.

The index bar P and the upright bar M' are to be similarly graduated.

Now, from the above it will be seen that a reduced copy of the original statue can be easily made, for if we take notice of the number of divisions which any assumed point in the original statue intercepts on the side $b$ of the rod E, we should raise the slide O to the corresponding number of divisions on that side of the rod M' which agrees with the side $c$ of the rod E. We advance the rod P in like proportion to the advance of the rod M. Both rods are similarly divided, so that each may be used for measuring the statue according as it is placed on either revolving table.

Having thus described my invention I shall claim—

1. The graduated revolving table B in combination with the graduated vertical rod E having a slide K and graduated horizontal index rod M arranged upon it for measuring the proportions of a statue, and combining an apparatus so arranged with another and similar apparatus on which the block of marble is placed, and of which a copy of the statue on the revolving table B is to be made, the whole being constructed and arranged substantially in manner and for the purposes herein above set forth.

2. Also attaching an arm H to the lower part of the rod E, and forming diagonal holes through the slide K, through which latter the rod M may be inserted, the same being for the objects before described.

3. Also the method above described of arranging the reducing divisions on the rods and index bars, by which a copy of any statue may be made of a smaller size than the original statue.

In testimony that the foregoing is a true description of my said invention and improvements I have hereto set my signature this twenty eighth day of January in the year eighteen hundred and forty-two.

HENRY DEXTER.

Witnesses:
R. H. EDDY,
EZRA LINCOLN, Jr.